Jan. 7, 1941.　　　　　　S. BIRO　　　　　　2,227,921
STEAM WASHER
Filed June 6, 1939　　　2 Sheets-Sheet 1

INVENTOR.
Sandor Biro
BY
ATTORNEY.

Jan. 7, 1941.  S. BIRO  2,227,921
STEAM WASHER
Filed June 6, 1939  2 Sheets-Sheet 2
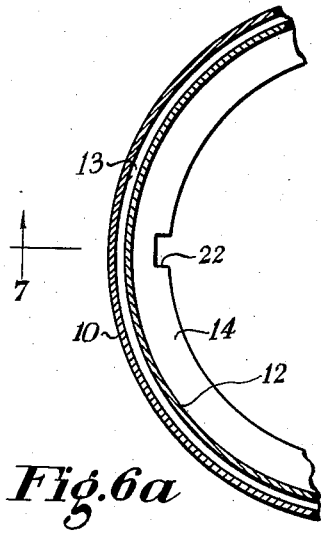
Fig.6a
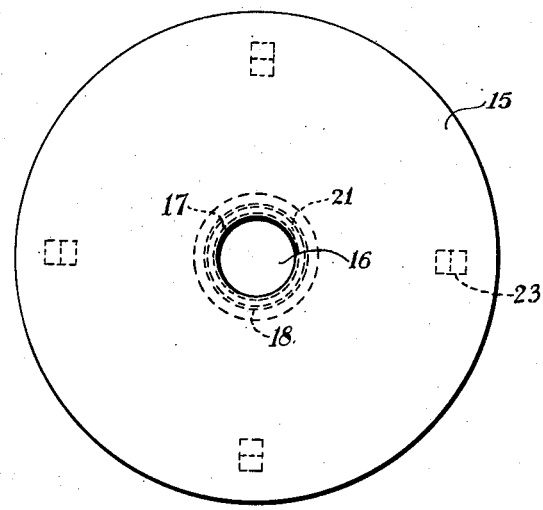
Fig.6
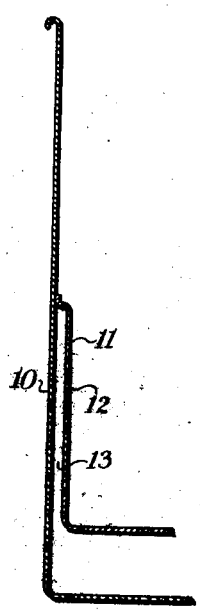
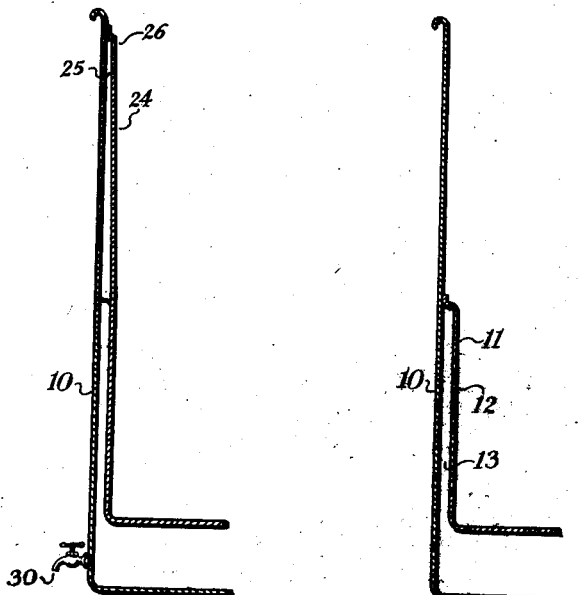
Fig.8  Fig.9
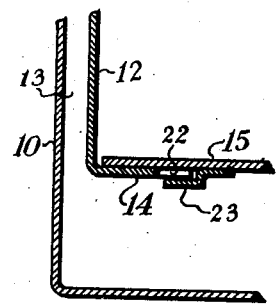
Fig.7
INVENTOR.
Sandor Biro
BY
Daniel G. Cullen
ATTORNEY.

Patented Jan. 7, 1941

2,227,921

UNITED STATES PATENT OFFICE

2,227,921

STEAM WASHER

Sandor Biro, Detroit, Mich.

Application June 6, 1939, Serial No. 277,674

1 Claim. (Cl. 68—193)

This application relates to steam washers and aims particularly to provide a steam washer which is far more efficient in its action than washers heretofore known.

The washer herein disclosed is of the type wherein continuous circulation of boiling water is created merely by the application of heat to the bottom of the vessel containing the water and the flow of boiling water through the soiled clothes within the vessel accomplishes the washing.

In the steam washer hereof there is a vessel and a pot within it. Within the pot is contained the soiled clothing to be washed and in the space between the vessel and pot flows the boiling water, that space communicating with the interior of the pot above and below the mass of clothing. The relative diameters of the pot and vessel are such that that space is a restricted path and a small part of the volume of the pot and the communicating openings between that space and the interior of the pot are small, whereby the flow and action of the water are accelerated.

For an understanding of the washer herein disclosed, reference should be had to the appended drawings disclosing the washer. In these drawings, Fig. 1 is a sectional elevation of the washer;

Figs. 2, 3, 4, 5, 7, 8, and 9 are sections on corresponding lines of other figures.

Figure 2:
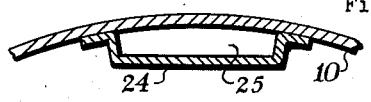
Figure 4:
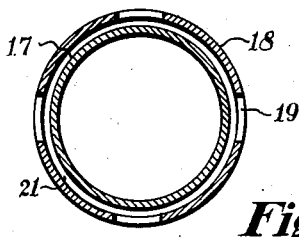
Figure 3:
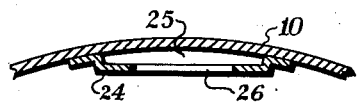
Figure 5:
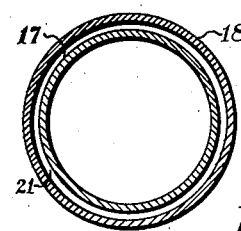
Figure 1:
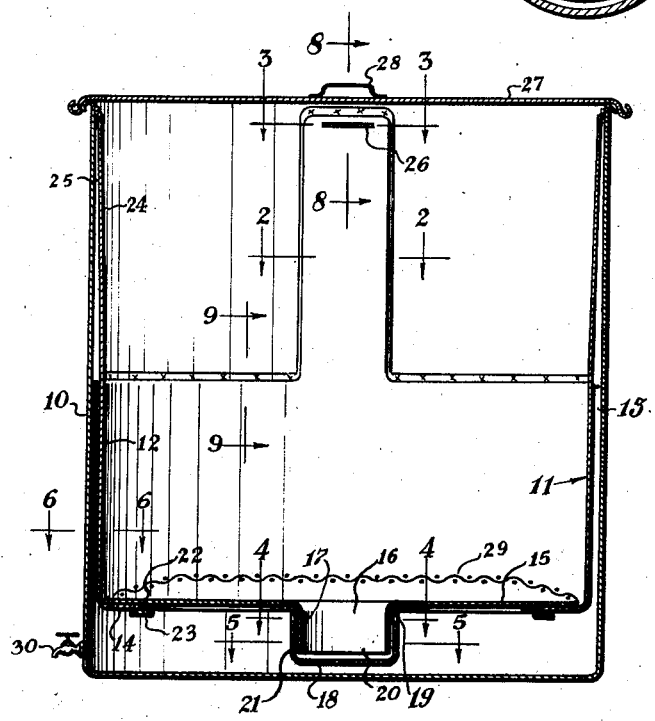

Figs. 6 and 6a show parts with these views taken as if on the line 6—6 of Fig. 1.

The steam washer hereof comprises an open top shell or vessel 10 within which is a pot 11 formed of an annulus 12 spaced from the shell 10, as at 13, and having an inwardly flanged lower edge 14 removably and detachably supporting a bottom plate 15 spaced from the shell bottom and having a center hole 16 surrounded by an open bottom depending sleeve 17 in turn surrounded by an open top cup 18 permanently secured to the plate 15 and having side openings 19 above the open bottom 20 of the sleeve to communicate the interior of the pot with the space below the pot bottom through opening 20, space 21 between sleeve 17 and cup 18, and openings 19.

Notches 22 in the edge of flange 14 and lugs 23 formed on the under side of bottom plate 15 provide a detachable bayonet type interlock between the sides and bottom of the pot.

The annulus 12 has upwardly extending circumferentially spaced extensions 24 formed to be clear of the side of the shell to provide spaces 25, and these have openings 26. The upper edge of the annulus 12 and the upper and side edges of the extensions are welded or soldered to the side of the shell 10, whereby spaces 13 and 25 are sealed from the interior of the pot, communicating only through the upper openings 26 and the lower passage 16—20—21—19.

To cover the entire device there is provided a flanged loose fitting cover 27 having a handle 28.

To support clothes in the pot above and clear of the hole 16 there may be provided an arched wire grille 29.

For draining the device there may be provided a valved faucet 30.

Pot 11 and vessel 10 are but slightly different in diameter whereby the sealed space 13—25 between the pot and the vessel is only a small fraction of the entire volume of the pot, whereby the flow and action of the water are accelerated.

Similarly, hole 16, sleeve 17, and cup 18 have a small diameter compared to that of the pot, to accelerate the flow and action of the water.

Now having described the steam washer herein disclosed, reference should be had to the claim which follows for a determination of the invention.

I claim:

A steam washer for clothes comprising a vessel, a pot but slightly smaller in size than and disposed within said vessel and spaced slightly therefrom and having its upper edge well below the upper edge of the vessel and formed with a plurality of upwardly extending portions, with the upper edge of the pot and its extensions formed to be in sealing relation to said vessel to form one small sealed annular space between the pot and vessel sides, and a plurality of small sealed spaces between the side of the vessel and the upwardly extending portions of the pot, these spaces communicating with the space between the pot and the vessel, a small hole in the bottom of the pot, an open bottom sleeve depending from the bottom of the pot and surrounding the hole, and an open top closed bottom cup closely surrounding the sleeve, and extending up to the bottom of the pot, the cup having side openings above the lower edge of the sleeve, which is spaced from the cup bottom, and the upwardly extending portions of the pot also having openings.

SANDOR BIRO.